United States Patent
Su

(10) Patent No.: US 6,332,596 B1
(45) Date of Patent: Dec. 25, 2001

(54) DEVICE FOR RELEASABLY MOUNTING WRIST SUPPORT TO COMPUTER KEYBOARD

(75) Inventor: Chih-Wen Su, Chung Ho (TW)

(73) Assignee: Behavior Tech Computer Corp., Taipei (TW)

( * ) Notice: Subject to any disclaimer, the term of this patent is extended or adjusted under 35 U.S.C. 154(b) by 0 days.

(21) Appl. No.: 09/659,697

(22) Filed: Sep. 11, 2000

(51) Int. Cl.[7] .................................................. B43L 15/00
(52) U.S. Cl. .................... 248/118.1; 248/118; 248/222.11
(58) Field of Search ................................. 248/118, 118.1, 248/222.12, 222.13, 918, 222.11

(56) References Cited

U.S. PATENT DOCUMENTS

| 3,514,064 | * | 5/1970 | Katz . | |
| 5,660,360 | * | 8/1997 | Yang | 248/118.1 |
| 5,904,327 | * | 5/1999 | Cheng | 248/118.1 |
| 6,029,940 | * | 2/2000 | Klein | 248/222.12 X |

* cited by examiner

Primary Examiner—Ramon O. Ramirez
Assistant Examiner—Korie Chan
(74) Attorney, Agent, or Firm—Rosenberg, Klein & Lee

(57) ABSTRACT

A device for releasably mounting a wrist support to a keyboard is disclosed. The device includes a slide movably received in a slot defined in a front extension of the keyboard. The slide has a bottom projection extending beyond a bottom face of the keyboard for manually moving the slide and an L-shaped top projection having a segment spaced from a top surface of the slide for defining a channel. A guide plate is fixed to the keyboard by a bolt and has an edge movably received in the channel for retaining the slide in the slot and guiding the movement of the slide. A catch is attached to the slide to be movable therewith between a released position and a secured position. The catch forms a barb whereby when the catch is at the secured position, the barb engages an opening defined in the wrist support for securing the wrist support to the keyboard and when the catch is at the released position, the barb disengages from the opening of the wrist support for releasing the wrist support from the keyboard. The catch is biased by a spring toward the secured position for securely retaining the wrist support on the keyboard. The wrist support may be removed by moving the catch to the released position for disengaging the barb from the opening of the wrist support.

8 Claims, 5 Drawing Sheets

DEVICE FOR RELEASABLY MOUNTING WRIST SUPPORT TO COMPUTER KEYBOARD

FIELD OF THE INVENTION

The present invention generally relates to a computer keyboard, and in particular to a device for releasably mounting a wrist support to a computer keyboard.

BACKGROUND OF THE INVENTION

A keyboard is a common input device for a computer. A user usually uses two hands to operate the keyboard. However, in operating a keyboard, a user must suspend his or her wrists. This causes extreme strains on the user's wrists in an excessive period of operating the keyboard. A wrist support is usually attached to a front side of the keyboard for supporting the wrists of the user.

Some conventional wrist supports are integrally fixed with a keyboard. Adding a wrist support to a keyboard increases the overall size of the keyboard and consequently, costs of package and transportation of the keyboard are increased. Furthermore, such an integral structure of the wrist support and the keyboard does not allow a user to change the wrist support. This may causes problem when a computer is to be used by many users, including adults and children, for the length of the arms is different between an adult and a child.

Wrist supports having a foldable structure are also available in the market. Such foldable wrist supports can overcome the size problem, but is still not suitable for different users due to its inexchangeability.

It is thus desirable to provide a device for releasably mounting a wrist support to a keyboard for overcoming the above-discussed problems.

SUMMARY OF THE INVENTION

Accordingly, an object of the present invention is to provide a device for releasably mounting a wrist support to a keyboard for allowing ready change of the wrist support.

Another object of the present invention is to provide a device for releasably mounting a wrist support to a keyboard for allowing ready removal of the wrist support in order to reduce the overall size of the keyboard assembly.

To achieve the above objects, in accordance with the present invention, there is provided a wrist support mounting device for releasably mounting a wrist support to a keyboard comprising a slide movably received in a slot defined in an front extension of the keyboard. The slide has a bottom projection extending beyond a bottom face of the keyboard for manually moving the slide and an L-shaped top projection having a segment spaced from a top surface of the slide for defining a channel. A guide plate is fixed to the keyboard by a bolt and has an edge movably received in the channel for retaining the slide in the slot and guiding the movement of the slide. A catch is attached to the slide to be movable therewith between a released position and a secured position. The catch forms a barb whereby when the catch is at the secured position, the barb engages an opening defined in the wrist support for securing the wrist support to the keyboard and when the catch is at the released position, the barb disengages from the opening of the wrist support for releasing the wrist support from the keyboard. The catch is biased by a spring toward the secured position for securely retaining the wrist support on the keyboard. The wrist support may be removed by moving the catch to the released position for disengaging the barb from the opening of the wrist support.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
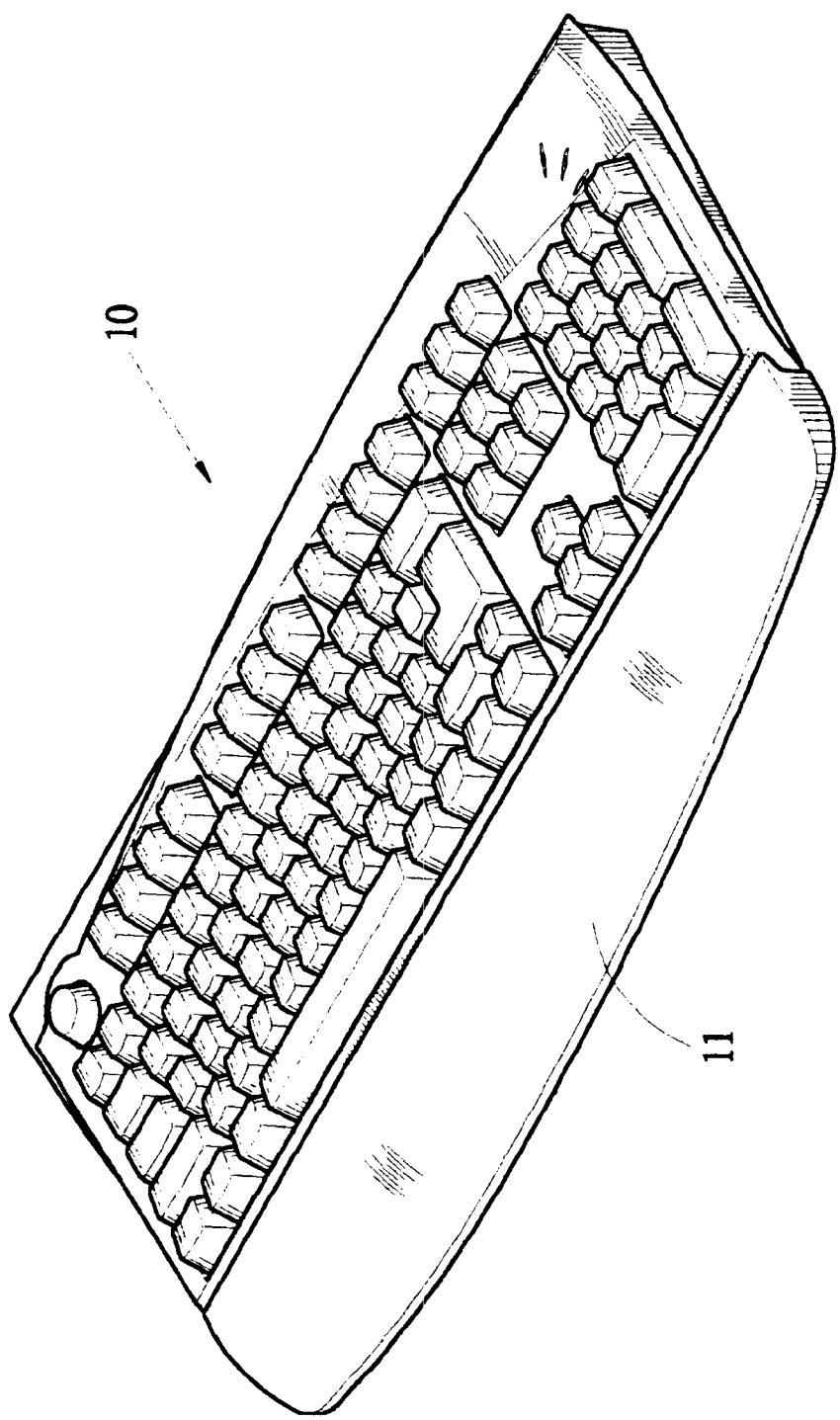
FIG. 1 is a perspective view showing a keyboard to which a wrist support is mounted by means of a wrist support mounting device constructed in accordance with the present invention.

With reference to the drawings and in particular to FIG. 1, a computer keyboard 10 is shown with a wrist support 11 attached thereto for supporting the wrists of the hands of a computer user (not shown). In accordance with the present invention, a wrist support mounting device is disclosed for releasably mounting the wrist support 11 to the computer keyboard 10 whereby the computer user may replace or change the wrist support 11 with a new or different one.

Figure 2:
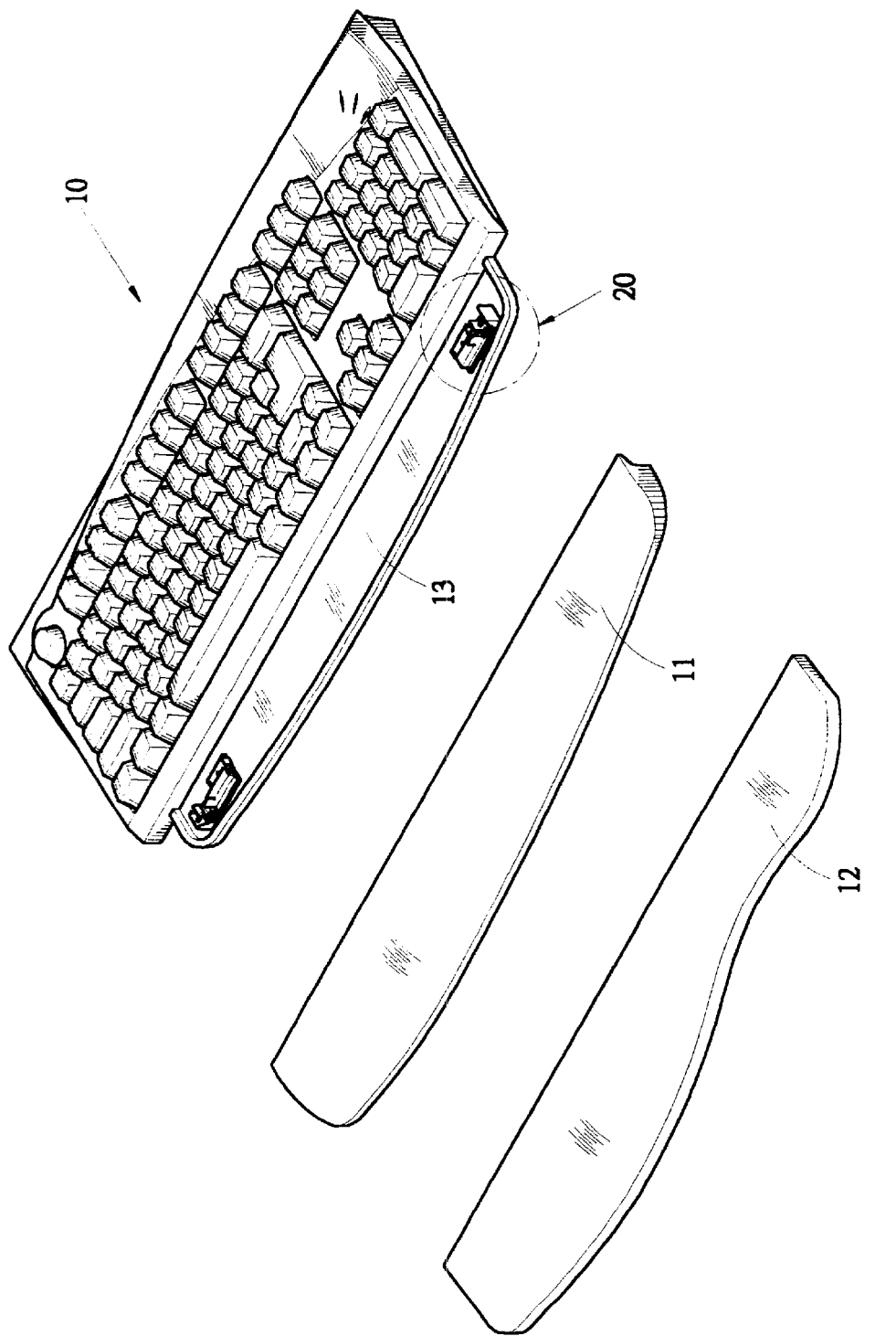
FIG. 2 is an exploded view of FIG. 1.
Figure 3:
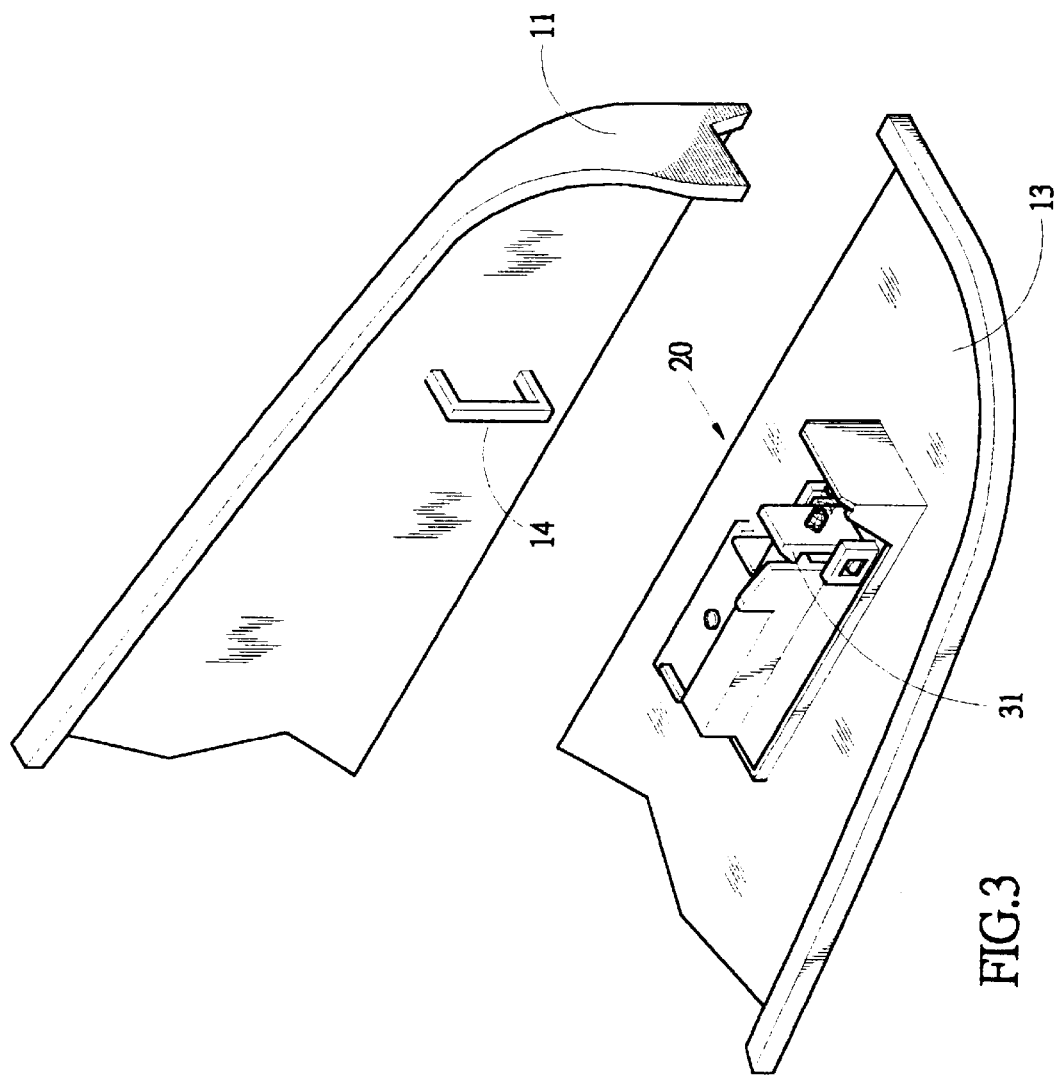
FIG. 3 is an enlarged view of the encircled portion of FIG. 2.

Referring to FIGS. 2 and 3, a front extension 13 is formed on a front side of the keyboard 10. The front extension 13 may be integrally formed with the keyboard 10 or it may be secured thereto by any known means, such as bolts. The wrist support mounting device of the present invention comprises at least one, preferably two as shown in FIG. 2, retention means 20. The retention means 20 releasably engages a corresponding U-shaped member 14 formed on an underside of the wrist support 11 for retaining the wrist support 11 to the keyboard 10. The U-shaped member 14 defines an opening (not labeled) with which a moveable catch 23 of the retaining means 20 engages, as shown in FIG. 5, thereby securely retaining the wrist support 11 to the keyboard 10.

Figure 4:
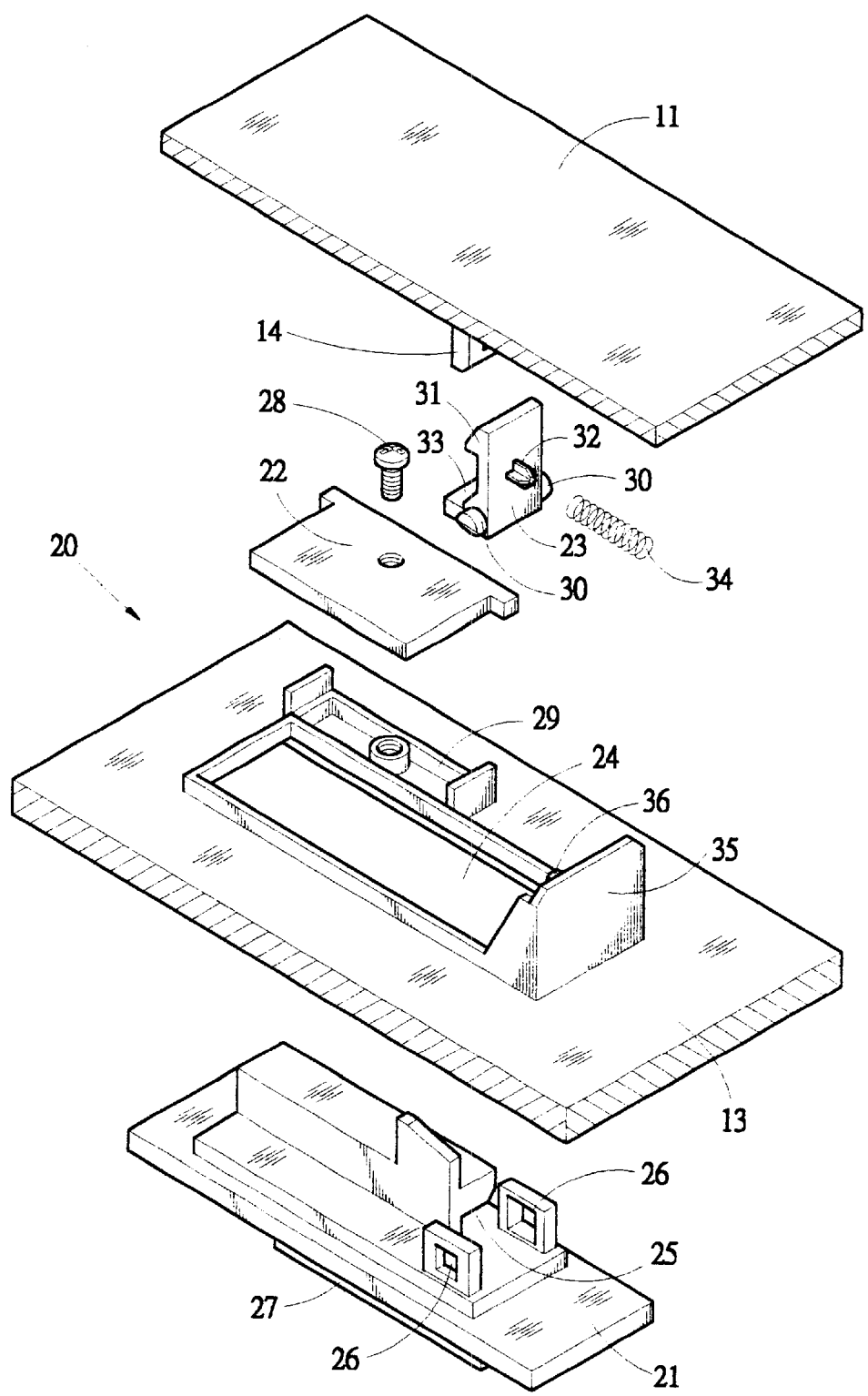
FIG. 4 is an exploded view of the wrist support mounting device of the present invention.
Figure 5:
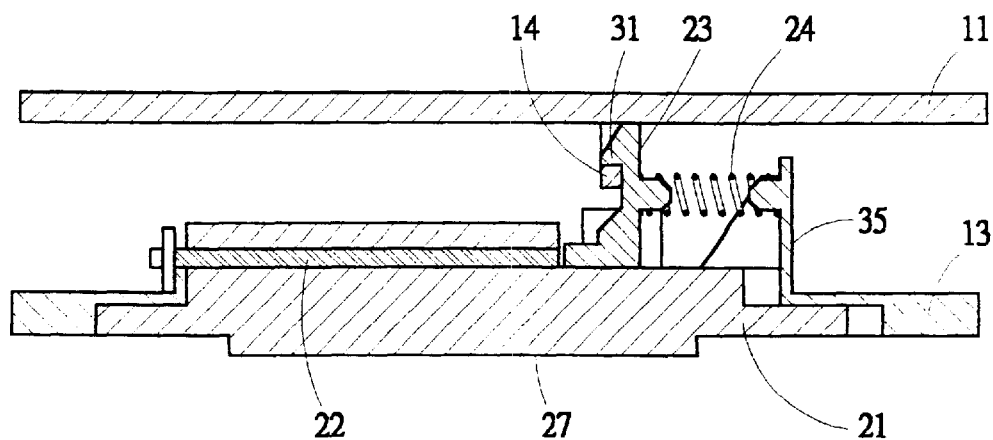
FIG. 5 is a cross-sectional view of the wrist support mounting device showing the wrist support mounting device at a secured position.
Figure 6:
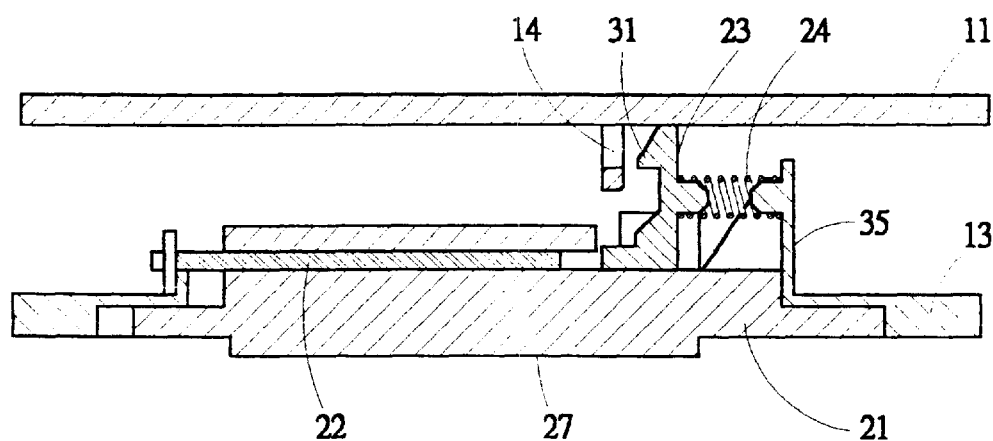
FIG. 6 is similar to FIG. 5 but showing the wrist support mounting device at a released position.

With references to FIGS. 4–6, a slot 24 is defined in the front extension 13. The retention means 20 comprises a slide 21 movably received in the slot 24 for being movable between a released position (FIG. 6) and a secured position (FIG. 5). The slide 21 has a bottom projection 27 formed on a bottom surface thereof and extending beyond a bottom face of the front extension 13 through the slot 24 for being accessible and operable by the user. The slide 21 has a top surface on which an inverted L-shaped projection (not labeled) is formed. The projection has a segment spaced from and substantially parallel to the top surface of the slide for defining a channel 25 therebetween.

A guide plate 22 is secured to the front extension 13 with an edge portion (not labeled) thereof movably received in the channel 25 of the slide 21 for guiding the movement of the slide 21. Preferably, a retainer 29 is formed on the front extension 13 comprising two opposite walls (not labeled) for receiving and retaining the guide plate 22 therein. A bolt 28 extends through a hole (not labeled) defined in the guide plate 22 and engages with an inner-threaded hole (not labeled) defined in the front extension 13 for securing the guide plate 22 to the front extension 13. The slide 21, being engaged by the guide plate 22, is retained in the slot 24 of the front extension 13.

The catch 23 is attached to the top surface of the slide 21 by a pair of pins 30 extending from opposite sides of the catch 23 in opposite direction and received in holes 26 defined in the slide 21 whereby the catch 23 is movable substantially in unison with the slide 21 for being moved between the secured position and the released position. Preferably, two opposite tabs (not labeled) are formed on the top surface of the slide 21 with the holes 26 defined therein and aligned with each other to receive the pins 30 and thus attaching the catch 23 to the slide 21.

The catch 23 comprises a bottom plate 33 in surface contact with the top surface of the slide 2 for stably retaining the catch 23 on the top surface of the slide 21. A barb or projection 31 is formed on a top end of the catch 23 for engaging the U-shaped member 14 of the wrist support 11. Preferably an inclined camming surface or a chamfered end (not labeled) is formed on a free end of the barb 31. The catch 23 is biased toward the secured position by a helical spring 34 with opposite ends attached to a sideways projection 32 formed on the catch 23 and a corresponding projection 36 formed on an end wall 35 that is formed on the front extension 13.

When the wrist support 11 is mounted to the keyboard 10, the U-shaped member 14 contacts the barb 31 of the movable catch 23 first. The camming action between the camming surface of the barb 31 and the U-shaped member 14 drives the catch 23 and thus the slide 21 against the biasing spring 34 away from the secured position and eventually, the U-shaped member 14 slides over the camming end of the barb 31 and the biasing force of the spring 34 causes the barb 31 into engagement with the U-shaped member 14 thereby securing the wrist support 11 to the keyboard 10 as shown in FIG. 5.

To remove the wrist support 11 from the keyboard 10, the catch 23 is moved toward the released position by user's manually moving the slide 21, an thus the catch 23, by the bottom projection 27 as shown in FIG. 6. The U-shaped member 14 is disengaged from the catch 23 and is free to remove from the keyboard 10.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A device for releasably mounting a wrist support to a portion of a keyboard comprising:

a slide movably received in a slot defined in the portion of the keyboard, the slide comprising a bottom projection extending beyond a bottom face of the portion of the keyboard adapted to be manually moved and a top surface on which a channel is defined;

a guide plate fixed to the portion of the keyboard and having an edge movably received in the channel for retaining the slide in the slot and guiding the movement of the slide;

a catch fixed to the slide to be movable between a released position and a secured position, the catch forming a barb whereby when the catch is at the secured position, the barb engages an opening defined in the wrist support for securing the wrist support to the keyboard and when the catch is at the released position, the barb disengages from the opening of the wrist support for releasing the wrist support from the keyboard.

2. The device as claimed in claim 1 further comprising biasing means for biasing the catch to the secured position.

3. The device as claimed in claim 2, wherein the biasing means comprising a helical spring having a first end mounted to the catch and a second end fixed to an end wall formed on the portion of the keyboard.

4. The device as claimed in claim 1, wherein the catch comprises a pair of pins extending from opposite sides thereof in opposite directions to be received in aligned holes defined in opposite tabs formed on the slide thereby attaching the catch to the slide.

5. The device as claimed in claim 1, wherein the catch further comprises a bottom plate is surface contact with the top surface of the slide for stably retaining the catch on the slide.

6. The device as claimed in claim 1, wherein an L-shaped member is formed on the top surface of the slide, the L-shaped member having a segment spaced from the top surface of the slide for defining the channel.

7. The device as claimed in claim 1, wherein the guide plate is attached to the portion of the keyboard by a bolt.

8. The device as claimed in claim 1, wherein the barb forms an inclined camming surface on a free end thereof for facilitating engagement of the barb with the opening of the wrist support.

\* \* \* \* \*